(12) United States Patent
Henrici et al.

(10) Patent No.: US 11,168,890 B2
(45) Date of Patent: Nov. 9, 2021

(54) COOKING APPARATUS LIGHT WITH FORM LOCKING LIGHT CONDUCTOR ROD

(71) Applicant: BJB GmbH & Co. KG, Arnsberg (DE)

(72) Inventors: Philipp Henrici, Arnsberg (DE); Olaf Baumeister, Sundern (DE); Frank Welslau, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 17/155,548

(22) Filed: Jan. 22, 2021

(65) Prior Publication Data

US 2021/0278089 A1    Sep. 9, 2021

(30) Foreign Application Priority Data

Mar. 3, 2020 (DE) .......................... 102020105708.3
Mar. 3, 2020 (DE) .......................... 202020101175.8
Mar. 3, 2020 (DE) .......................... 202020101176.6

(51) Int. Cl.
*F24C 15/00* (2006.01)
*F21V 17/06* (2006.01)
*F21V 8/00* (2006.01)
*F21Y 115/10* (2016.01)

(52) U.S. Cl.
CPC ............ *F24C 15/008* (2013.01); *F21V 17/06* (2013.01); *G02B 6/0006* (2013.01); *G02B 6/0008* (2013.01); *F21Y 2115/10* (2016.08)

(58) Field of Classification Search
CPC ... F24C 15/008; G02B 6/0008; G02B 6/0006; F21V 17/06
See application file for complete search history.

(56) References Cited

U.S. PATENT DOCUMENTS

| | | | |
|---|---|---|---|
| 9,857,513 B2 * | 1/2018 | Yang | G02B 6/0006 |
| 2003/0006230 A1 * | 1/2003 | Kaji | H05B 6/1218 |
| | | | 219/620 |
| 2006/0078266 A1 * | 4/2006 | Wu | G02B 27/0927 |
| | | | 385/146 |
| 2018/0003391 A1 * | 1/2018 | Lee | H05B 6/12 |
| 2020/0337523 A1 * | 10/2020 | Pillai | A47L 15/4293 |

FOREIGN PATENT DOCUMENTS

| | | |
|---|---|---|
| CN | 206802854 U | 12/2017 |
| DE | 102015104575 | 11/2015 |
| DE | 102016116446 | 3/2018 |
| DE | 102018111092 A1 | 11/2019 |
| DE | 202019106169 U1 | 12/2019 |
| EP | 2366323 A1 | 9/2011 |

OTHER PUBLICATIONS

English translation of DE102018111092A1, Holtdirk. Nov. 14, 2019 (Year: 2019).*

* cited by examiner

*Primary Examiner* — Evan P Dzierzynski
(74) *Attorney, Agent, or Firm* — Von Rohrscheidt Patents

(57) ABSTRACT

A cooking apparatus light including a carrier that forms an illuminant receiver wherein an illuminant configured as a circuit board including at least one LED is received in the illuminant receiver, wherein the carrier includes a receiving spout that is connected through an opening with the illuminant receiver; and a light conductor rod that is received in the receiving spout and fed light emitted by the illuminant through the opening between the receiving spout and the illuminant receiver, wherein the light conductor rod is fixed in the carrier in an axial direction of the light conductor rod by a form locking connection.

3 Claims, 10 Drawing Sheets

COOKING APPARATUS LIGHT WITH FORM LOCKING LIGHT CONDUCTOR ROD

RELATED APPLICATIONS

This application claims priority from and incorporates by reference German patent application DE 10 2020 105 708.3 and German utility model applications DE 20 2020 101 175.8 and DE 20 2020 101 176.6 all filed on Mar. 3, 2020.

FIELD OF THE INVENTION

The invention relates to a cooking apparatus light.

BACKGROUND OF THE INVENTION

Generic cooking apparatus lights are known in the art in many shapes or forms e.g., from DE 10 2018 111 092 A1. Herein a light conductor rod is supported by a carrier in a receiving spout and exits from the receiving spout on one side. A LED circuit board is arranged on a receiver of the carrier wherein the receiver is arranged opposite to an exit side of the light conductor rod. The LED is positioned in a portion of a light infeed surface of the light conductor rod. A cooling element is coupled with the carrier in order to receive operating heat from the LED and to dissipate it into an ambient.

In DE 10 2018 111 092 A1 the receiving spout is configured cylindrical and envelops a longitudinal section of the light conductor rod. The receiving spout is configured slotted in an axial direction and enveloped by a clamping ring. The clamping ring builds up a clamping tension that presses the wall of the receiving spout against the light conductor rod and thus supports the light conductor rod in the carrier in a friction locking manner.

Though a fixation of the light conductor rod in the carrier is satisfactory, mounting the clamping ring is quite complicated. The clamping ring has to be slid over a free end of the light conductor rod onto the receiving spout after inserting the light conductor rod into the receiving spout. In order to apply clamping forces, the clamping ring has to be expanded against a spring tension. Even when the clamping ring is provided with bars on an outer circumference to reduce friction forces wherein the bars include slanted surfaces for simplified placement of the clamping ring, the mounting forces that need to be applied are still rather high. Additionally, edges of the clamping ring have to be machined for the ring that is typically made from spring steel not to damage the receiving spout that is typically made from a synthetic material.

BRIEF SUMMARY OF THE INVENTION

Thus, it is an object of the invention to provide a cooking apparatus light that facilitates simplified light conductor rod mounting.

The object is achieved by a cooking apparatus light including a carrier that forms an illuminant receiver wherein an illuminant configured as a circuit board including at least one LED is received in the illuminant receiver, wherein the carrier includes a receiving spout that is connected through an opening with the illuminant receiver; and a light conductor rod that is received in the receiving spout and fed light emitted by the illuminant through the opening between the receiving spout and the illuminant receiver, wherein the light conductor rod is fixed in the carrier in an axial direction of the light conductor rod by a form locking connection.

A form locking connection has the advantage of simpler and essentially zero force mounting compared to a friction locking connection by a clamping ring that is known in the art. The form locking connection can be e.g., a bayonet connection that requires small forces at the most when inserting the light conductor rod into the receiving spout and when rotating the light conductor rod in the receiving spout. When spring elements are used in the form locking connection configured as a bayonet connection in order to support the light conductor rod in its interlocking seat spring forces of the spring elements are small and can be overcome easily.

Thus, the light conductor rod is inserted into the receiving spout through an opening of the receiving spout that is oriented away from the light source in an advantageous embodiment of the invention. This way mounting the light conductor rod is independent from mounting the light source.

Particularly advantageously the form locking connection is formed by a support element at the carrier and a circumferential relief cut at the light conductor rod, wherein the support element engages the circumferential relief cut in order to fix the light conductor rod at the carrier.

Particularly advantageously form locking connections are used where the light conductor rod is provided with a relief cut in its circumferential surface, e.g., configured as a groove introduced into the circumferential surface and wherein a support element is provided at the carrier and engages the circumferential relief cut. A multitude of different form locking connections can be implemented using this basic principle wherein the form locking connections satisfy different mounting requirements but also operating requirements of the cooking apparatus light in a cooking apparatus. It is for example is conceivable that the support element is a support lug that is formed by a wall of the receiving spout wherein the wall includes a U-shaped incision. This support lug can be deformed after the light conductor rod is inserted into the receiving spout and oriented with its circumferential relief cut towards the support lug wherein the support lug is bent towards the light conductor rod. Then the support lug engages the relief cut and supports the light conductor rod in the carrier.

This solution provides zero resistance insertion of the light conductor rod into the receiving spout where a particularly force minimized assembly is required. Damaging the light conductor rod through the support element while inserting the light conductor rod into the receiving spout is not possible. Therefore, this variant is suitable e.g., for a carrier with a metal receiving spout.

Alternatively, it is provided that an interlocking element protrudes into the cavity of the receiving spout that receives the light conductor rod wherein the interlocking element engages the circumferential relief cut of the light conductor rod.

This interlocking element can also be configured as a spring elastic support lug that protrudes into the cavity of the receiving spout.

In any case the interlocking element is advantageously configured in the carrier itself and engages the movement path of the light conductor rod during insertion into the receiving spout. Using interlocking elements has the advantage of very simple mounting wherein the engagement of the interlocking element into the circumferential relief cut of the light conductor rod additionally provides a tactile assembly check.

The carrier and the light conductor rod can include corresponding alignment contours in order to fix the light conductor rod in particular with respect to a rotation about a longitudinal center axis in a defined position in the carrier.

In an advantageous embodiment, the support lug and the circumferential relief cut include corresponding alignment contours that support the light conductor rod with respect to its longitudinal center axis secured against rotation in the light element.

This defined orientation is required when the light conductor rod includes a dedicated light exit surface that has to be oriented in a defined direction due to the configuration of the cooking apparatus.

These alignment contours can include for example a straight edge of an interlocking element or of a support lug on one side that cooperate with a flat non-cambered circumferential surface section of the light conductor rod, advantageously of the circumferential relief cut of the light conductor rod.

In another variant it is provided that the receiving spout for the light conductor rod includes a cutout in a circumferential wall and the support element is formed by a spring-loaded plug that is placeable onto an outer circumference of the receiving spout and that includes at least one retaining arm that engages the circumferential relief cut of the light conductor rod that is aligned with the cutout.

This is a second variant where zero force insertion of the light conductor rod into the receiving spout is possible and where the mechanical form locking fixing of the light conductor rod and also its orientation is only fixed by the subsequent placement of the spring-loaded plugs.

Furthermore, the support element is a retaining ring with undersize that is arranged at an inner circumference in a wall of the receiving spout and engages the circumferential relief cut of the light conductor rod.

BRIEF DESCRIPTION OF THE DRAWINGS

Additional features and advantages of the invention are now described based on two embodiments with reference to drawing figures, wherein.

DETAILED DESCRIPTION OF THE INVENTION

Figure 1:
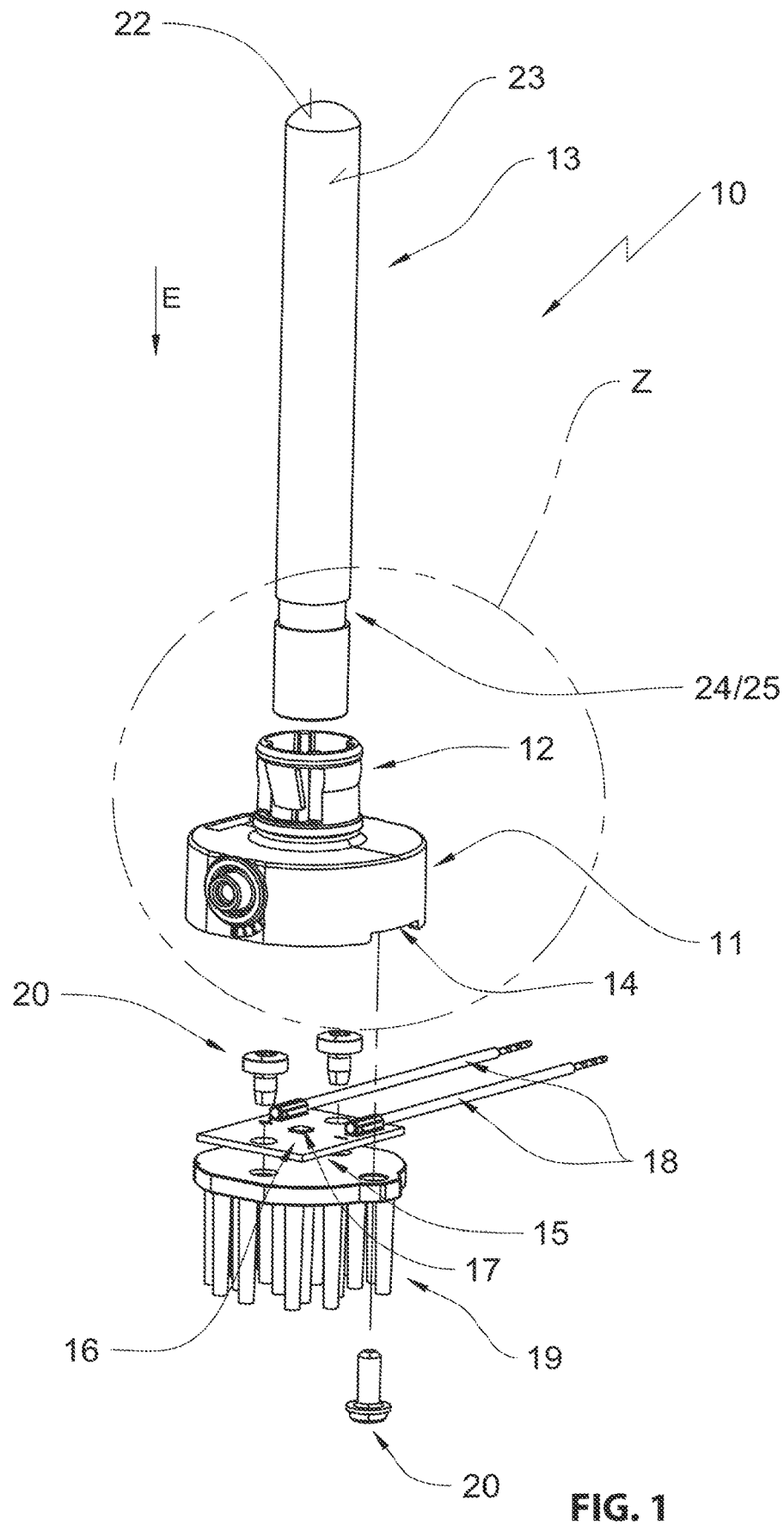
FIG. 1 illustrates an exploded view of a first embodiment of the cooking apparatus light according to the invention.

FIGS. 1-5 illustrate a detailed description of a cooking apparatus light 10. FIGS. 6-10 illustrate a second embodiment of the cooking apparatus light. In as far as both embodiments include identical or equivalent components identical reference numerals will be used and as far as the embodiments are different, different reference numerals will be used and different functions will be described separately.

The cooking apparatus light according to the first embodiment is designated overall with reference numeral 10 and described with reference to FIGS. 1-5.

The exploded view of the cooking light apparatus 10 illustrated in FIG. 1 illustrates its essential individual components.

The cooking apparatus light 10 includes a carrier 11 that is typically made from a synthetic material but can also be made from another material. The carrier 11 includes a receiving spout 12 wherein a cylindrical light conductor rod 13 is inserted into the receiving spout in the insertion direction E. Thus, the receiving spout 12 includes a light conductor rod entry opening 31 that is arranged at a side of the receiving spout 12 that is oriented away from the illuminant receiver 14.

The carrier 11 forms an illuminant receiver 14 on a side that is oriented away from the receiving spout 12 wherein the illuminant receiver is a receiving dish that is open on one side.

The illuminant receiver 14 supports an illuminant 15 that is made from a circuit board 16 that includes at least one LED 17 that is provided with electrical power through a connection conductor 18.

The circuit board 16 is attached to a cooling body by suitable fasteners 20, e.g., threaded bolts. However, interlocking plugin devices are advantageous that facilitate mounting the circuit board 16 on the cooling element without any loose fasteners.

The unit formed by the illuminant 15 and the cooling body 19 is inserted into the illuminant receiver 14 of the carrier 11 and fixed therein by suitable fasteners 20. Also in this location interlocking plugin devices are advantageous in addition to threaded bolts. However, it is also advantageous that the carrier 11 forms interlocking devices itself, e.g., configured as interlocking protrusions or interlocking hooks that cooperate with interlocking protrusions of the illuminant 15 or of the cooling body 19 to provide fixing in the illuminant receiver 14.

In the illustrated embodiment the light conductor rod 13 is circular cylindrical and includes a light infeed surface 21 at an end that is oriented towards the carrier 11 wherein the light infeed surface forms a base of the circular cylinder. A cylinder ceiling forms a light exit surface 22 on a side of the cylinder that is oriented away from the light infeed surface 21 wherein a surface of the light exit surface 22 is spherical convex in order to scatter the light in a broad range.

Variants of light conductor rods 13 are known where the light is run laterally out of the enveloping surface. A location of light exit is secondary for the core idea of the invention. It is not required either that the light conductor rod 13 has a circular cylindric contour. Other contours are conceivable depending on a particular application of the cooking apparatus light.

The cylinder enveloping surface 23, also designated as circumferential surface includes a relief cut 24, also subsequentially designated as circumferential relief cut. In the instant first embodiment this is an annular groove 25.

Figure 2:
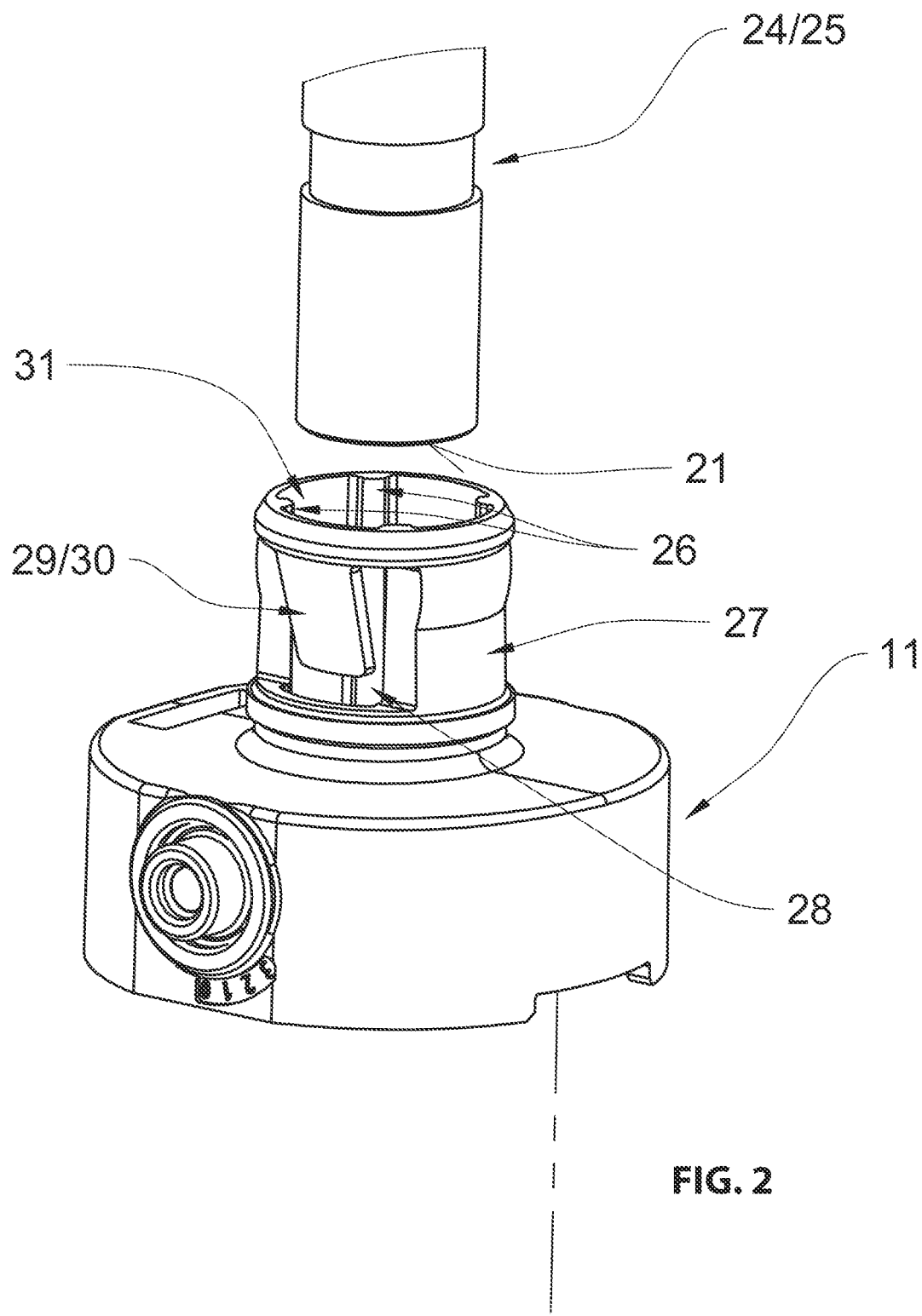
FIG. 2 illustrates a blown-up view of detail circle Z in FIG. 1.

As evident from FIGS. 1-2 the relief cut 24 is arranged offset from the light infeed surface 21. Therefore, the full cross-section of the cylindrical light conductor rod 13 is available for the light infeed surface 21. The cross-section reduction caused by the circumferential relief cut 24 is offset from the light infeed surface 21. This configuration has the essential advantage that a large light infeed surface 21 is available for feeding light into the light conductor rod 13 and an amount of light that is being fed is not reduced by a cross-section reduction of the light conductor rod in the portion of the light infeed surface 21.

It is evident from FIG. 2 in particular that that the receiving spout 12 is a hollow cylindrical body with an inner wall that includes centering ribs 26. The enveloping wall 27 of the receiving spout 12 is provided with a substantially U-shaped incision 28. This way the enveloping wall 27 forms a support element configured as an interlocking spring 29 or retaining lug 30 with a root proximal to the light entry opening 31 of the receiving spout 12. The light conductor rod entry opening 31 is arranged distal from the illuminant or at an end of the receiving spout 12 that is oriented away from the illuminant receiver. In the embodiment according to FIG. 2 the interlocking spring 29 is deflected inward towards the hollow cylindrical receiving cavity of the receiving spout 12 and thus protrudes into the movement path of the light conductor rod 13 on which the light conductor rod 13 is introduced in the insertion direction E into the receiving spout 12.

Figure 3:
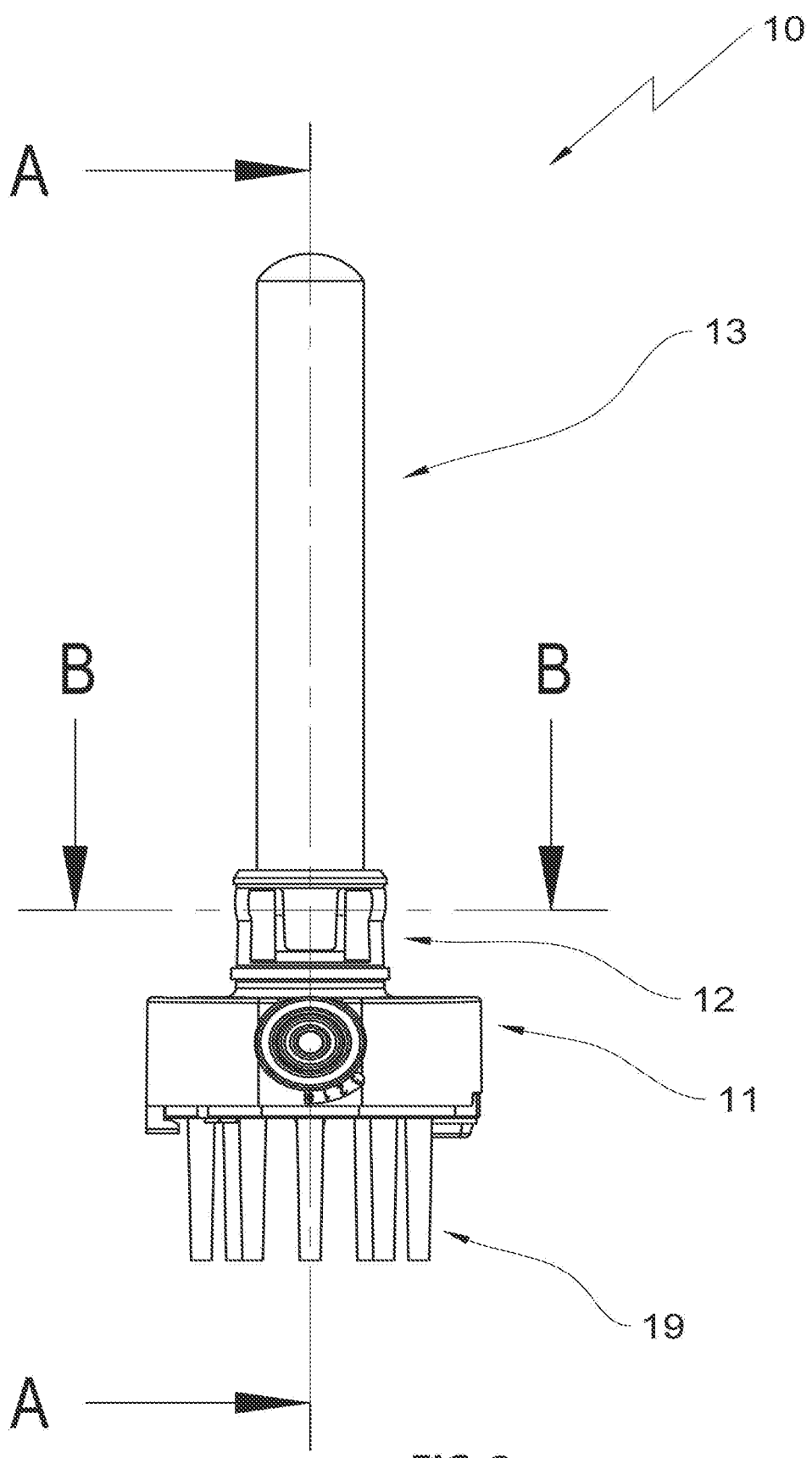
FIG. 3 illustrates an assembled cooking apparatus light according to FIG. 1 in a side view.

FIG. 3 illustrates the cooking apparatus light 10 in FIG. 1 in assembled condition. The light conductor rod 13 is arranged in the receiving spout 12 of the carrier 11. The sub assembly including the illuminant 15 and the cooling body 19 is fixed in the illuminant receiver 14.

Figure 4:
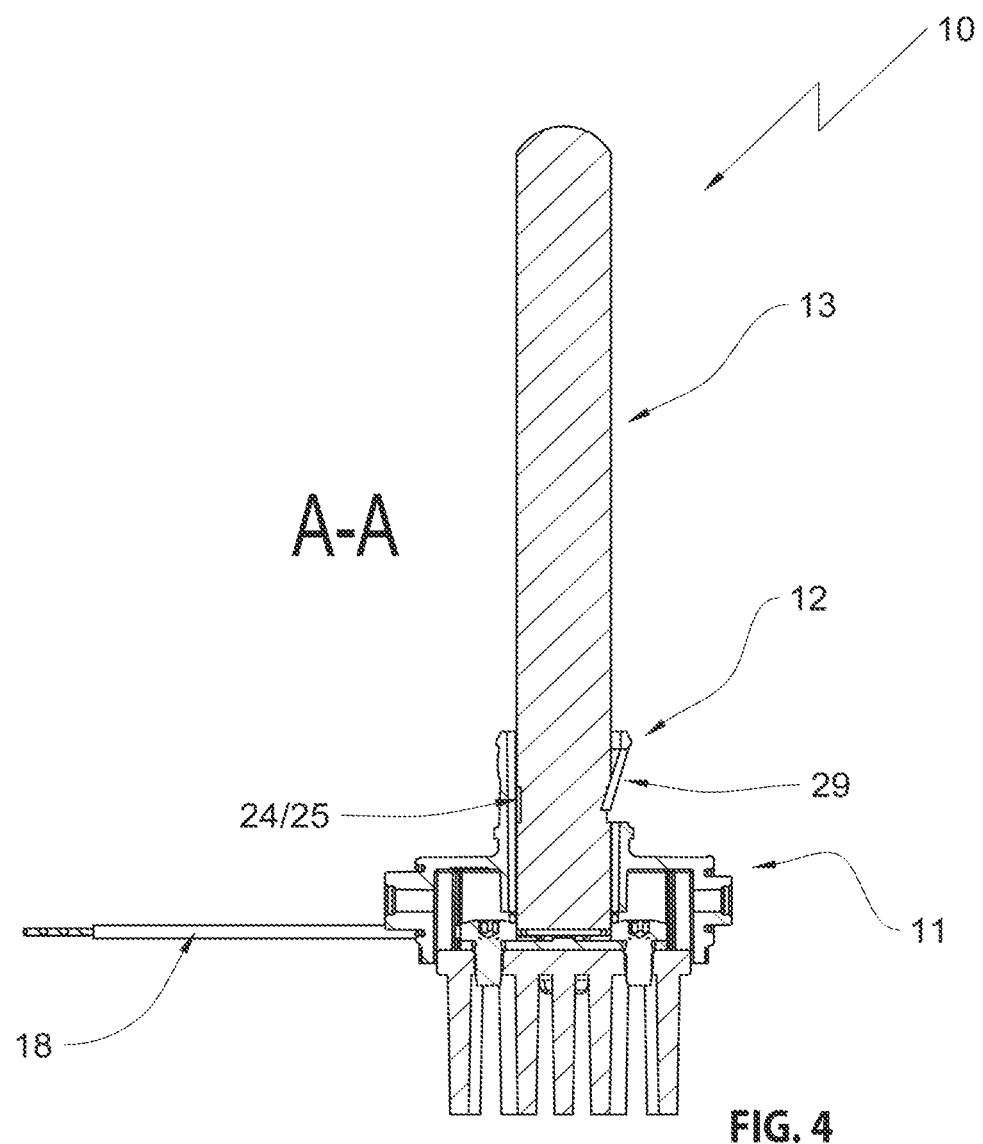
FIG. 4 illustrates a sectional view of the cooking apparatus light according to sectional line A-A in FIG. 3.
Figure 5:
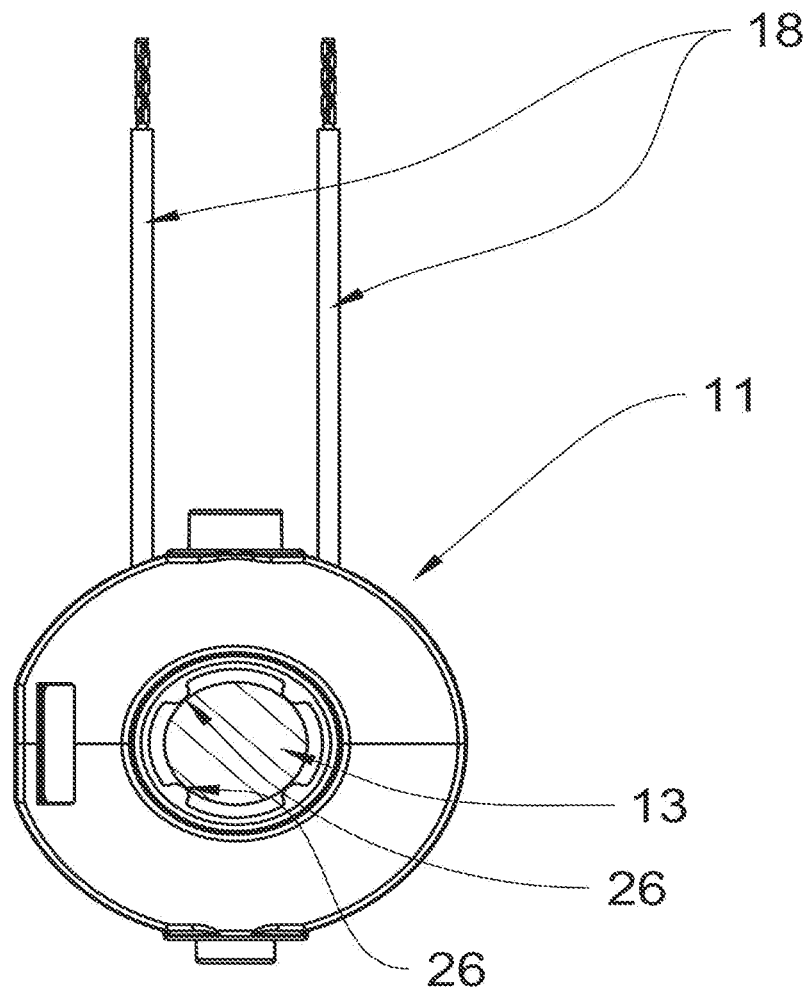
FIG. 5 illustrates a sectional view of the cooking apparatus light according to sectional line B-B in FIG. 3.
Figure 6:
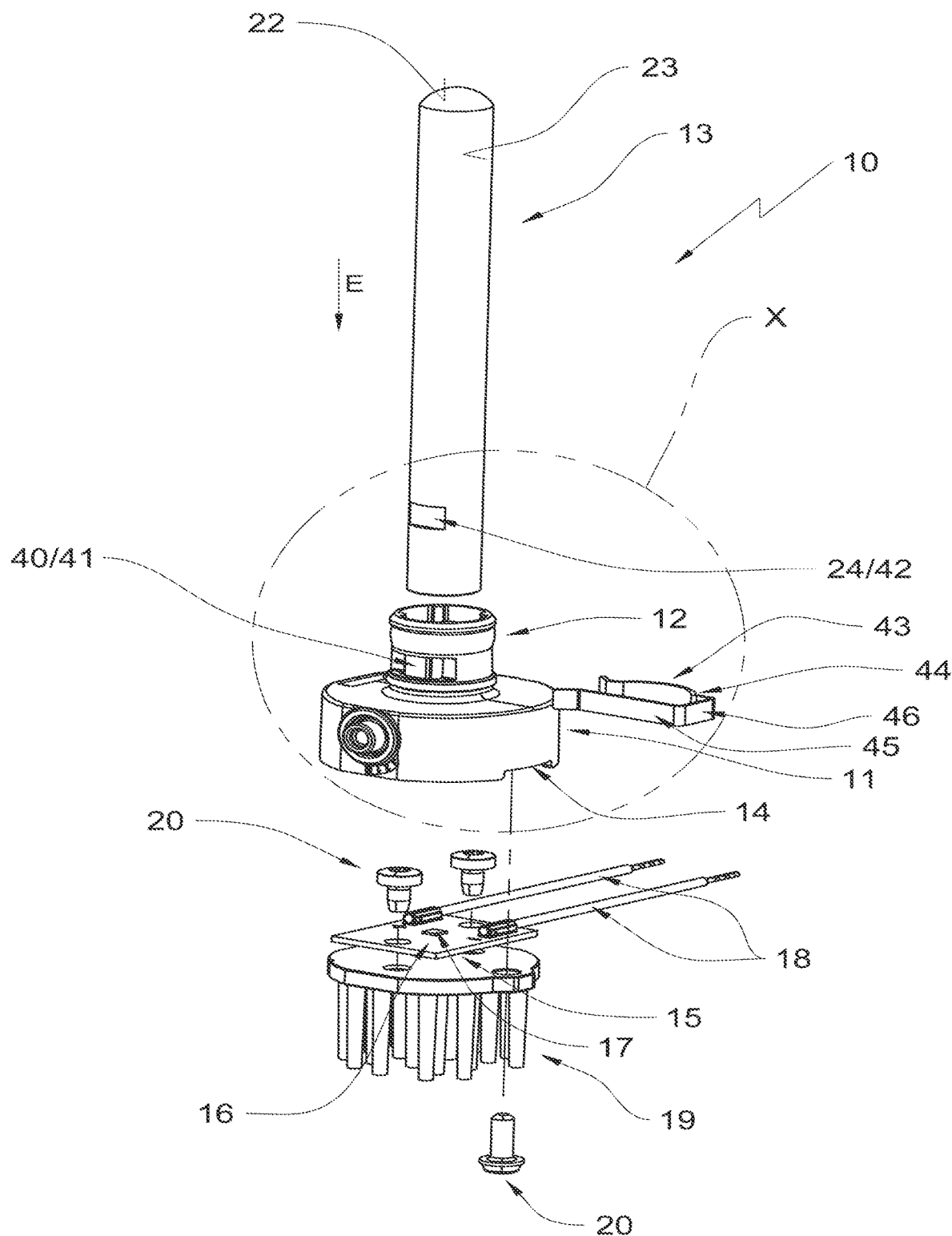
FIG. 6 illustrates an exploded view of a second embodiment of the cooking apparatus light according to the invention.
Figure 7:
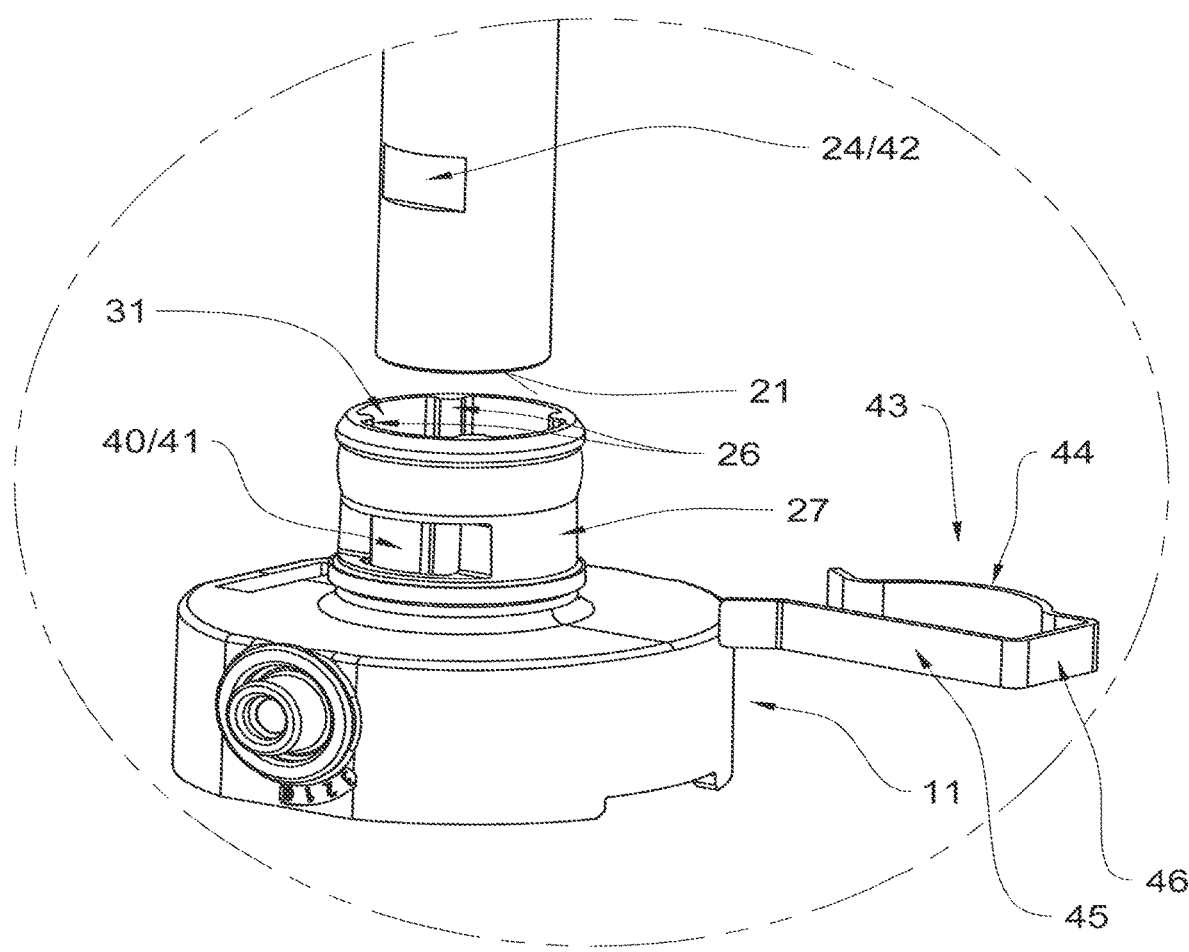
FIG. 7 illustrates a blown-up view according to detail circle X in FIG. 6.
Figure 8:
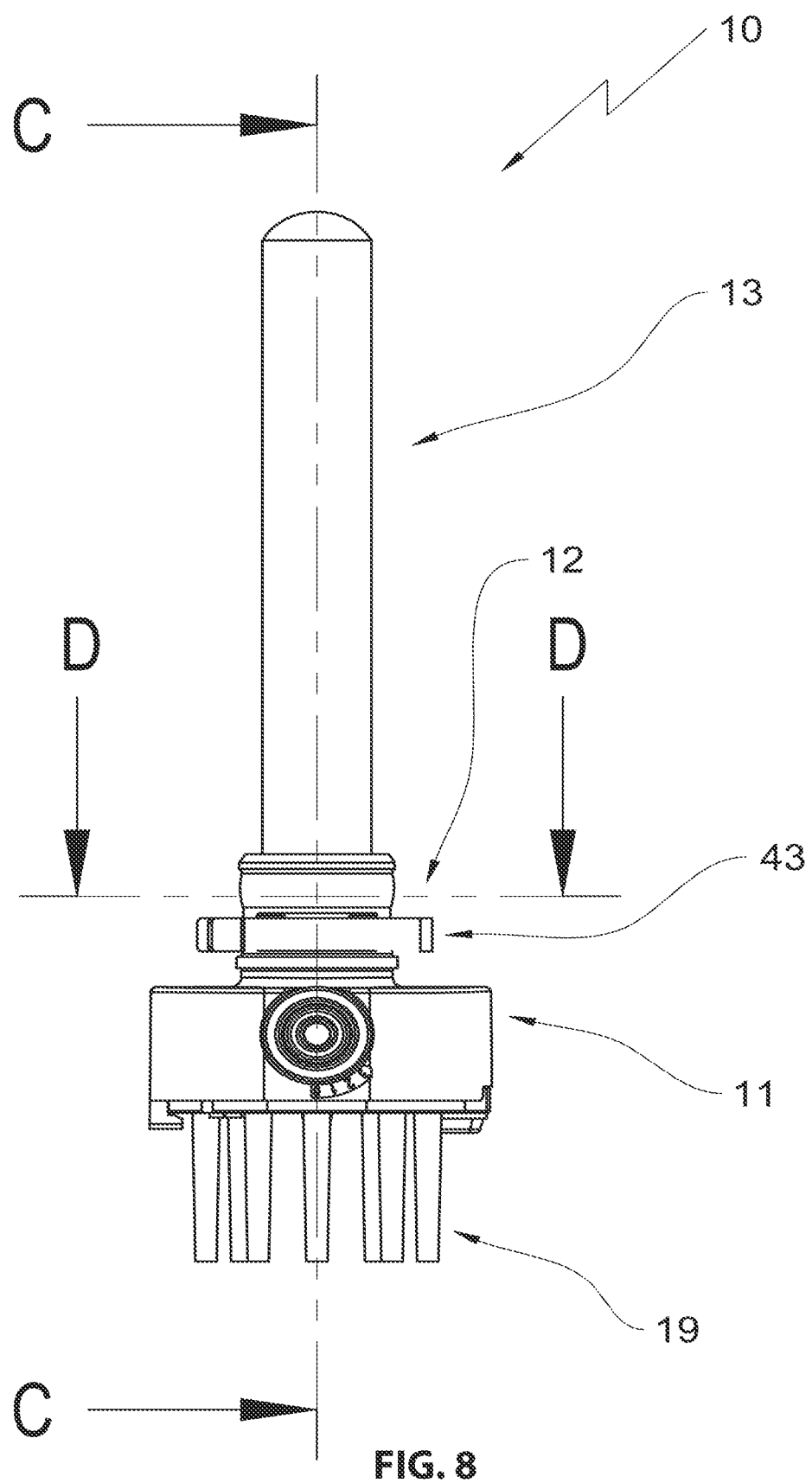
FIG. 8 illustrates the assembled cooking apparatus light according to FIG. 6 in a side view.
Figure 9:
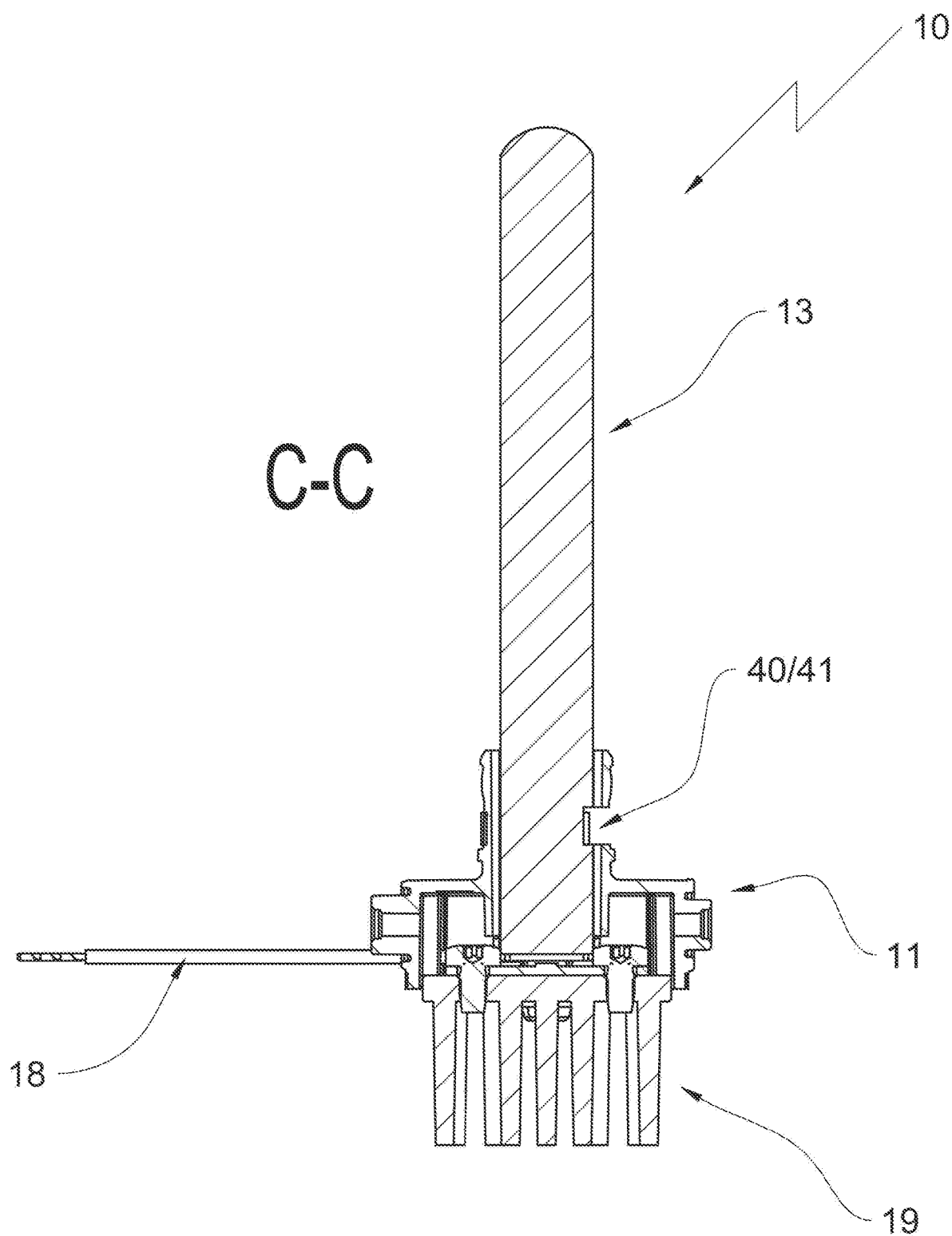
FIG. 9 illustrates a sectional view of the cooking apparatus light according to sectional line C-C in FIG. 8.
Figure 10:
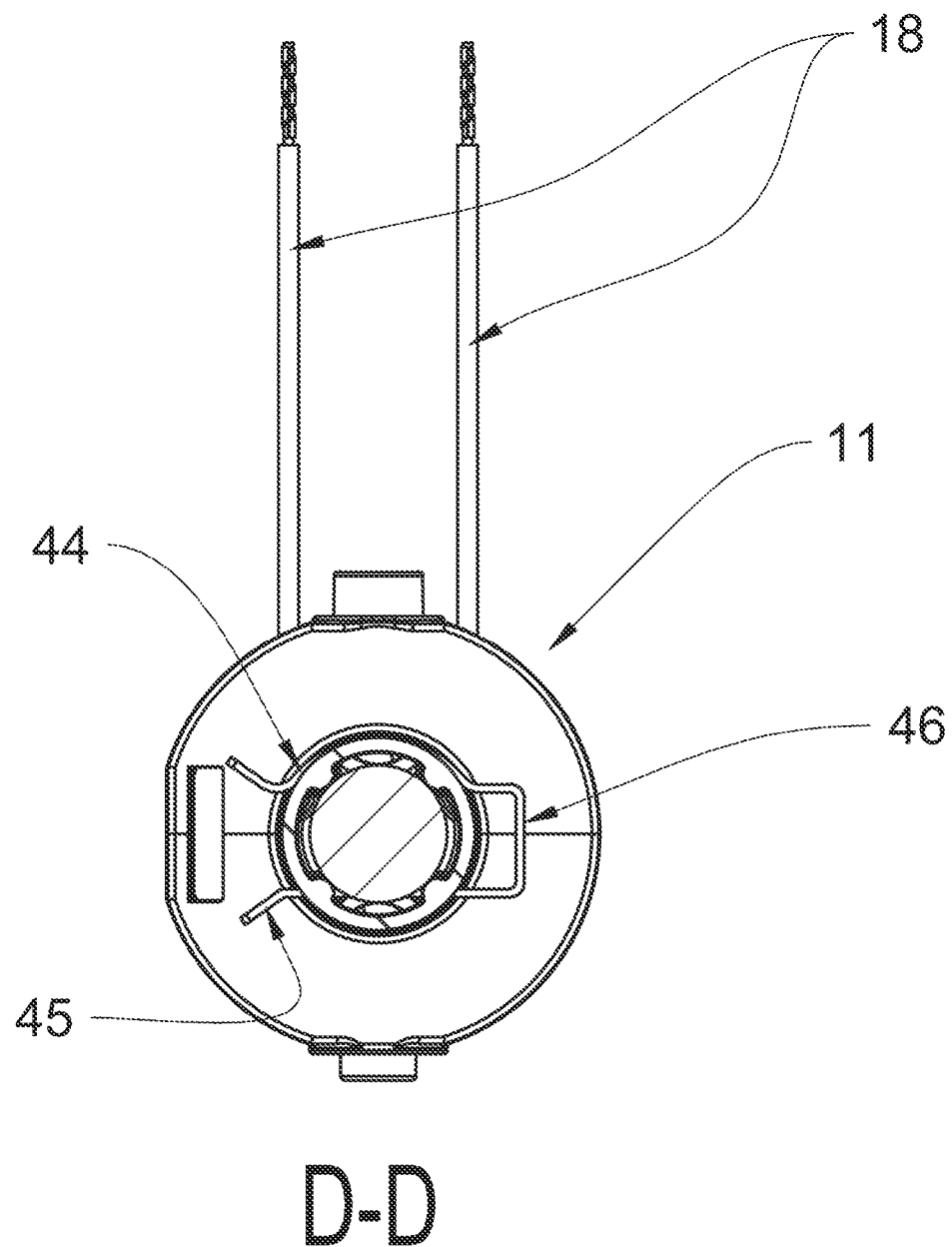
FIG. 10 illustrates a sectional view of the cooking apparatus light according to sectional line D-D in FIG. 8.

FIG. 5 is a sectional view according to the sectional line B-B in FIG. 3 and shows the hollow cylindrical receiving spout 12 with its centering ribs 26 that support the light conductor rod 13 centered in the receiving spout 12, FIG. 4 is a sectional view along the sectional line A-A in FIG. 3 and shows the fixing of the light conductor rod 13 in the carrier 11 clearly. It is evident from the sectional view how the interlocking spring 29 of the receiving spout 12 engages the circumferential relief cut 24 of the light conductor rod 13, thus configured as an annular groove 25. The free edge of the interlocking spring 29 contacts the groove wall that is proximal to the illuminant and thus counteracts an extraction force that is oriented opposite to the insertion direction E.

Inserting the light conductor rod 13 into the hollow cylindrical receiving cavity of the receiving spout 12 deflects the interlocking spring 29 that protrudes into the movement path of the light conductor rod 13 from its idle position and the interlocking spring initially slides along the cylinder enveloping surface 23 of the light conductor rod 13. When reaching the annular groove 25 the interlocking spring 29 slides into the annular groove 25 which is manually detectable for an assembly technician so that the assembly technician knows that the light conductor rod 13 has reached its fixing position and the assembly process is complete.

During machine assembly the assembly path of the light conductor rod 13 that needs to be traveled in the insertion direction E is predetermined so that the assembly tool can perform the corresponding insertion movement.

It is conceivable that the light conductor rod 13 and the carrier 11 are provided with corresponding alignment contours. This way a defined orientation of the light conductor rod 13 can be achieved with respect to a rotation about a longitudinal center axis of the light conductor rod 13. Alignment contours of this type can be implemented in the simplest manner in the embodiment according to FIGS. 1-5 through alignment edges or alignment surfaces. Thus, the annular groove 25 can include a section with a non-cambered flat surface in which a straight edge of the free end of the interlocking spring 29 comes in contact so that a defined orientation is achieved.

It is also conceivable to provide merely a groove section in the cylinder enveloping surface 23 of the light conductor rod 13 instead of an annular groove wherein dimensions of the groove section correspond to dimensions of the interlocking spring. When the interlocking spring 29 engages the groove section, not only the fixing position of the light conductor rod 13 in the carrier 11 is reached but a corresponding orientation is provided as well.

FIGS. 5-10 describe a second embodiment of the invention. The configuration and the components of the cooking apparatus light 10 illustrated therein essentially correspond to the first embodiment. To avoid redundancy, the cooking apparatus light 10 according to the second embodiment is not described in detail and reference is made to the first embodiment according to FIGS. 1-5. In as far as the components have identical reference numerals the components perform identical or like functions.

The receiving spout 12 of the carrier 11 of the second embodiment differs slightly from the first embodiment as evident from FIGS. 1 and 2. The receiving spout includes a cut out 40 that forms a window 41 and facilitates entry into the hollow cylindrical receiving cavity of the receiving spout 12 for the light conductor rod 13.

The light conductor rod 13 includes a circumferential relief cut 24 configured as a groove cut out 42 that merely extends along a short circumferential section. Dimensions of the groove cut out correspond to dimensions of the cut out 40. A base of the groove cut out 42 is flat and non-cambered.

The retaining device is not an interlocking spring 29 or an interlocking lug like in the first embodiment. A spring-loaded plug 43 is used for the retaining device according to the second embodiment wherein the spring-loaded plug is bent U-shaped. The spring-loaded plug 43 includes an interlocking arm 44 and a retaining arm 45 which are connected with each other by a head arm 46. The free ends of the interlocking arm 44 and the retaining arm 45 are bent in an outward direction.

The light conductor rod 13 is slid in the insertion direction E into the hollow cylindrical receiving spout 12. Ideally the circumferential relief cut 24 is aligned with the cut out 40 or the window 41 which, however, is not mandatory at this assembly step.

Now the spring-loaded plug 43 is slid onto an outer circumference of the jacket wall 27 of the receiving spout 12. The deflected free ends of the interlocking arm 44 and the retaining arm 45 facilitate sliding on the spring-loaded plug wherein arms 44, 45 of the spring-loaded plug spread building up a spring load. The interlocking arm 44 is bent up front according to a contour of the jacket wall 27 of the receiving spout 12 and includes a section with a circular arc shaped camber in the instant embodiment. In its mounting position the circular arc shaped section of the interlocking arm 44 of the spring-loaded plug 43 contacts an outer circumferential surface of the enveloping wall 27 of the receiving spout 12 and supports the spring-loaded plug 43 at the receiving spout 12.

In the illustrated embodiment the retaining arm 45 is uncambered besides its free end and contacts the cut out 40 with a section. If not done yet, now is the time to rotate the light conductor rod 13 about its longitudinal center axis in the receiving spout 12 to align the groove incision 42 with the cut out 40 and with the retaining arm 45 inserted therein. The retaining arm 45 then engages the groove incision 42. A flat uncambered base surface of the groove incision contacts the non-cambered retaining arm 45 with an entire area of the flat non-cambered base surface so that a defined alignment of the light conductor rod 13 is provided in addition to a support against the insertion direction E.

In another embodiment a form locking fixing of the light conductor rod 13 in the carrier 11 can be provided e.g., by a retaining ring. Thus, the retaining ring can sit in an inner circumferential groove of the enveloping surface wall 27 of the receiving spout 12. This retaining ring is fabricated with an undersize relative to an outer circumference of the light conductor rod 13. The light conductor rod 13 includes a circumferential relief cut that is engaged by the retaining ring in order to support the light conductor rod 13 in the carrier 11.

REFERENCE NUMERALS AND DESIGNATIONS

10 cooking apparatus light
11 carrier
12 receiving spout
13 conductor rod (cylindrical)
14 illuminant receiver
15 illuminant
16 circuit board
17 LED
18 connection conductor
19 cooling body
20 retaining device
21 light infeed surface/cylinder base
22 light exit surface/cylinder ceiling
23 cylinder enveloping surface/circumferential surface
24 relief cut/circumferential relief cut
25 annular groove
26 centering ribs
27 enveloping wall
28 incision
29 interlocking spring
30 retaining lug
31 light conductor rod entry opening
40 cut out
41 window
42 groove incision
43 spring elastic plug, retaining ring
44 interlocking arm
45 retaining arm
46 head arm
E insertion direction

What is claimed is:

1. A cooking apparatus light, comprising:
a carrier that forms an illuminant receiver wherein an illuminant configured as a circuit board including at least one LED is received in the illuminant receiver, wherein the carrier includes a receiving spout that is connected through an opening with the illuminant receiver; and
a circular cylindrical light conductor rod that is received in the receiving spout and fed light emitted by the illuminant through the opening between the receiving spout and the illuminant receiver,
wherein the circular cylindrical light conductor rod is fixed in the carrier in an axial direction of the circular cylindrical light conductor rod by a form locking and positive locking connection,
wherein the form locking and positive locking connection is formed by a retaining element at the carrier and a circumferential relief cut at the circular cylindrical light conductor rod,
wherein the retaining element engages the circumferential relief cut to fix the circular cylindrical light conductor rod at the carrier in the axial direction,
wherein the retaining element is a retaining ring that is arranged at an inner circumference of a wall of the receiving spout, and
wherein the retaining ring engages the circumferential relief cut of the circular cylindrical light conductor rod.

2. The cooking apparatus light according to claim 1, wherein the circumferential relief cut of the circular cylindrical light conductor rod is arranged at an axial distance from a face of the circular cylindrical light conductor rod that functions as a light infeed surface.

3. A cooking apparatus light, comprising:
a carrier that forms an illuminant receiver wherein an illuminant configured as a circuit board including at least one LED is received in the illuminant receiver, wherein the carrier includes a receiving spout that is connected through an opening with the illuminant receiver; and
a circular cylindrical light conductor rod that is received in the receiving spout and fed light emitted by the illumination through the opening between the receiving spout and the illuminant receiver,
wherein the circular cylindrical light conductor rod is fixed in the carrier in an axial direction of the circular cylindrical light conductor rod by a form locking and positive locking connection,
wherein the form locking and positive locking connection is formed by a retaining element at the carrier and a circumferential relief cut at the circular cylindrical light conductor rod,
wherein the retaining element engages the circumferential relief cut to fix the circular cylindrical light conductor rod at the carrier in the axial direction,
wherein the receiving spout for the circular cylindrical light conductor rod includes a cut out in a circumferential wall, and
wherein the retaining element is formed by a spring elastic plug that is applied to an outer circumference of the receiving spout and that includes at least one retaining arm that engages the circumferential relief cut of the circular cylindrical light conductor rod that is aligned with the cut out.

* * * * *